| United States Patent [19] | [11] | 4,062,920 |
|---|---|---|
| Lindquist | [45] | Dec. 13, 1977 |

[54] PROCESS FOR PRODUCING LITHIUM-CONTAINING FERRIMAGNETIC MATERIALS

[75] Inventor: Robert H. Lindquist, Berkeley, Calif.

[73] Assignee: Chevron Research Company, San Francisco, Calif.

[21] Appl. No.: 394,426

[22] Filed: Sept. 4, 1973

Related U.S. Application Data

[63] Continuation-in-part of Ser. No. 153,113, June 14, 1971, abandoned.

[51] Int. Cl.² .................. C04B 35/26; C04B 35/36
[52] U.S. Cl. .................. 264/153; 252/62.54; 252/62.6; 252/62.61; 252/62.64; 423/594
[58] Field of Search .............. 252/62.54, 62.6, 62.61, 252/62.62, 62.64; 423/594; 264/153

[56] References Cited

U.S. PATENT DOCUMENTS

| 3,370,011 | 2/1968 | Kitagawa et al. ............. 252/62.61 |
| 3,418,161 | 12/1968 | Bauer ......................... 252/62.54 X |
| 3,425,666 | 2/1969 | Lindquist et al. .............. 252/62.62 X |
| 3,583,918 | 6/1971 | Turnbull et al. ............... 252/62.61 |
| 3,607,753 | 9/1971 | Suchoff ....................... 252/62.61 |

*Primary Examiner*—Jack Cooper
*Attorney, Agent, or Firm*—D. A. Newell; R. H. Davies; J. D. Foster

[57] ABSTRACT

The invention is a process for manufacturing a material, a mass of finely divided particles of which an applied magnetic field can induce to change from a non-magnetized condition, in a sense of exhibiting no net external field, to a magnetized condition, in a sense of exhibiting an external field, which comprises:

a. reacting starting materials comprising a salt of an alkali metal, e.g., lithium, sodium or potassium, a salt of a first metal in a divalent state, a salt of iron in a trivalent state, at least one of said salts being a halide, and an epoxy compound in the presence of a solvent selected from the group consisting of lower alkanols and water to obtain a mixture comprising a metal hydroxide-containing and solvent-containing gel;

b. drying said gel to remove the majority of the solvent therefrom without significantly altering the distribution of lithium, sodium, or potassium therein to obtain porous particles; and c. heating the porous particles to produce the desired material. The preferred starting materials comprise a salt of lithium, a salt of manganese or magnesium, a salt of iron and propylene oxide, the preferred salts being the halides and, more particularly, the chlorides. The preferred solvent is methanol. Freeze drying is the preferred drying method.

7 Claims, No Drawings

PROCESS FOR PRODUCING LITHIUM-CONTAINING FERRIMAGNETIC MATERIALS

CROSS-REFERENCE TO RELATED APPLICATION

This application is a continuation-in-part of application Ser. No. 153,113, filed June 14, 1971, now abandoned.

Background

This invention is concerned with an improved process for manufacturing ferrimagnetic materials. The ferrimagnetic materials may be formulated into toroids useful in computer core memories.

Ferrimagnetic materials of the prior art include the following:

A. Ferrimagnetic ferrospinels (inverse ferrospinels):

1. Pure magnetic ferrites: $M^{2+}Fe_2^{3+}O_4$, where M is a metal other than cadmium or zinc, and the superscripts indicate the valence state of the metal. Examples: $MgFe_2O_4$, magnesium ferrite; $CoFe_2O_4$, cobalt ferrite; $FeFe_2O_4$, ferrous ferrite.

2. Mixed magnetic ferrites: $M_{A_X}{}^{2+}M_{B_{1-X}}{}^{2+}Fe_2{}^{3+}O_4$, where $M_A$ is a first metal and $M_B$ is a different metal.

Examples $Mg_X{}^{2+}Mn_{1-X}{}^{2+}Fe_2{}^{3+}O_4$
$Co_X{}^{2+}Mn_{1-X}{}^{2+}Fe_2{}^{3+}O_4$
where $X > 0$ and $1 > X$.

3. Substitution magnetic ferrites: $M_A{}^{2+}M_{B_X}{}^{3+}Fe_{2-X}{}^{3+}O_4$.

Examples $Mg^{2+}Al_X{}^{3+}Fe_{2-X}{}^{3+}O_4$
$Mg^{2+}Cr_X{}^{3+}Fe_{2-X}{}^{3+}O_4$
where $X > 0$ and $2 > X$.

4. Mixed substitution ferrites: $M_{A_X}{}^{2+}M_{B_{1-X}}{}^{2+}M_{C_Y}{}^{3+}M_{D_{2-Y}}{}^{3+}O_4$.

Example $Ni_X{}^{2+}Co_{1-X}{}^{2+}Al_Y{}^{3+}Fe_{2-Y}{}^{3+}O_4$
where
$X > 0$ and $1 > X$
$Y > 0$ and $2 > Y$ 5. Alkali metal "ferrite," for example: $Li_2O(Fe_2O_3)_5$, or $LiFe_5O_8$.

6. Mixed Alkali Metal Substitution Ferrites of 5 with any of 1-4 Above.

The present invention is concerned with an improved method for producing the mixed alkali metal substitution ferrites of paragraph 6 above, the resulting materials showing improved physical and other characteristics.

PRIOR ART PROCESSES FOR PRODUCING FERRIMAGNETIC MATERIALS, DEFICIENCIES THEREOF, AND DEFICIENCIES OF FERRIMAGNETIC MATERIALS SO PRODUCED

A. General: Prior art ferrimagnetic material preparation conventionally involves preparation of polycrystalline magnetic materials in two main steps: (a) preparation of a mixture, as uniform as possible, of the nonferrimagnetic starting materials; and (b) conversion of said starting materials at an elevated temperature to produce the desired ferrimagnetic material by solid state reaction. An example is the solid state reaction of NiO with $Fe_2O_3$ at an elevated temperature to produce the nickel ferrite, $NiFe_2O_3$. In such a solid state reaction the starting materials generally are prepared in powdered form, placed together and heated. The heating causes a mutual diffusion of constituents of each starting material to occur to cause growth at the surface of the two materials of a crystallite of the desired ferrimagnetic ferrospinel. When the resulting material is needed commercially in solid form, or, as is usually the case, the crystals are too big or not sufficiently uniform, the material is powdered again. Thereafter, if a solid shape is desired, the powder is formed into the desired shape and sintered.

B. Prior art preparation of a mixture of the nonferrimagnetic starting materials: Generally the oxide method is used, wherein the starting materials in oxide form are mixed together in the desired proportions by dry or wet ball milling. This is a process that takes hours to days. After the milling, the material is heated to 500° to 800° C. and the resulting material is rebroken and milled again. This process may be further repeated to obtain additional homogeneity. Another very similar method is the decomposition method, wherein the starting materials are mixed, by milling, in salt form instead of oxide form, and then the salts are converted to the oxides by thermal decomposition in air. Another method is the precipitation method, which has been used in an attempt to avoid the lengthy milling process of the oxide and decomposition methods. The objective is simultaneously to precipitate from a solution the required materials, in either hydroxide form or oxalate form, so that the precipitate contains the required metal hydroxides or metal oxalates in the correct proportions, already intimately mixed. For example, the starting materials for magnesium ferrite may be precipitated in hydroxide form as follows:

$$3\ FeSO_4 + 9\ OH^- \rightarrow 3\ Fe(OH)_3 + 3\ SO_4{}^= + 3e^-$$

$$MgSO_4 + 2\ OH^- \rightarrow Mg(OH)_2 + SO_4{}^=$$

The aforesaid oxide, decomposition and precipitation methods involve substantial disadvantages. In the oxide and decomposition methods the lengthy ball milling that is required is a disadvantage that the art has long recognized. Even with extended ball milling, there is room for much improvement in the homogeneity of the resulting mixture. The lack of homogeneity causes further undesirable results: for example, it contributes to lack of uniformity in the ferrimagnetic crystals formed upon subsequent heating of the mixture. The precipitation methods directionally improve mixture homogeneity, but entail other disadvantages. For example, when a strong base such as sodium hydroxide is used to cause precipitation, the anion, for example sodium, must be removed from the resulting mixture to purify it, and this can present a difficult purification problem.

C. Prior art heating of the starting material mixture to produce a ferrimagnetic material by solid state reaction: The solid state reaction of prior art mixtures of nonferrimagnetic oxides to produce a ferrimagnetic material is an extremely slow reaction, and is accomplished at such temperatures as 1300° to 1450° C. The prior art method has many disadvantages, mainly associated with the composition and form of the starting material mixture. The 1300° to 1450° C. temperature must be maintained for several hours, and slight variations in time, temperature and partial pressure of oxygen cause large and disproportionate effects on the properties of the final material. If the metals are not in their correct valence states in the starting material mixture, and the resulting ferrimagnetic material is formed into a solid shape and sintered, oxidation reactions will occur in the solid shape and cause cracks and imperfections therein. The metal cation constituents of the final ferrimagnetic material must migrate relatively large distances, on the order of a micron or more, through the structure of the oxygen anions, and there is a necessarily incomplete conversion of the starting material mixture to a ferrimagnetic material. The ferrimagnetic crystals are not uniform and because of the high temperatures that are necessary, the crystals are large; accordingly, the material must be ball milled again to reduce the crystal size to a desirable size.

D. Prior art preparation of shapes from oxide mixtures, followed by firing to convert the shaped material to a ferrimagnetic material: The two conventional methods of forming ferrimagnetic material precursor oxides into shapes are die pressing and extruding. In each method a binder and lubricant of organic additives, usually in a water vehicle, is used. A plasticizing agent also is needed in the extruding operation, and this agent must be blended thoroughly through the oxide mixture. The extruding operation is preferred for the production of tubes and rods of any particular cross-sectional shape. The shapes must be heated slowly during the low temperature range of the firing cycle to volatilize the organic additive slowly. Firing to convert the shaped oxide mixture to a ferrimagnetic material generally is accomplished at 1100° to 1350° C. Slow cooling, rather than quenching, minimizes internal strains. The finished ferrimagnetic shapes can be redimensioned by grinding.

E. Prior art preparation of shapes from ferrimagnetic materials: It is known to first fire the oxide mixtures to convert them to ferrimagnetic materials, and then to regrind these materials and form desired shapes from them by die pressing or extruding and firing in a manner similar to that described above.

F. Maximizing density of die pressed shapes: To obtain maximum density of die pressed shapes, the die pressing is carried out in a vacuum hot press in which the dies are heated above the plastic deformation temperature of the material, for example 1000° C., with pressure applied to the sample in a vacuum atmosphere. The density of the resulting shapes closely approaches the theoretical density of the material, compared to densities of shapes pressed at ambient conditions. The maximum density is desirable when it is desired to maximize the values of extrinsic magnetic properties, for example $B_S$ and $B_R$.

G. Prior Art Gelation Process: A distinct advantage over the prior art discussed in A–F above is provided by the gelation process described in U.S. Pat. No. 3,425,666, which patent is hereby referred to and specifically incorporated herein in its entirety by reference thereto. The process of U.S. Pat. No. 3,425,666 comprises, in short, the process of manufacturing a material, a mass of finely divided particles of which an applied magnetic field can induce to change from a non-magnetized condition in a sense of exhibiting no net external field to a magnetized condition in a sense of exhibiting an external field which comprises reacting starting materials comprising a salt of a first metal in a divalent state, a salt of iron in the trivalent state, and an epoxy compound to obtain a mixture comprising a metal hydroxide-containing gel, and heating said mixture to produce the desired composition.

H. Effect of added alkali metal, especially lithium: The prior art recognizes that the incorporation of an alkali metal, particularly lithium, as a component of a ferrite to form a mixed alkali metal substitution ferrite, leads to the production of ferrimagnetic materials, particularly computer memory cores, of improved properties. A property particularly improved by the presence, for example, of lithium is the shape of the anisotropy hysteresis loop for the ferrite, which is altered toward a desirably more square shape.

PRIOR ART DEVICES, PARTICULARLY COMPUTER MEMORY CORES, UTILIZING FERRIMAGNETIC MATERIALS, AND DEFICIENCIES IN MAGNETIC PROPERTIES OF SAID DEVICES

A computer memory core with its associated windings is a form of transformer. It is a closed flux path device which operates at radio frequencies (<1000 mc), and which generally has a low coercive force ($H_c$ <50 oersteds). The memory core generally has a toroid shape, and can be magnetized in either direction around the toroid. The toroid may be linked with one input wire, which must carry a current pulse, in either direction, sufficient to saturate or fully magnetize the core in either direction. Alternatively, the toroid may be so linked with two input wires (a "coincident-current" arrangement) that it may be fully magnetized by passing one-half the saturation current through each wire. In either case, a sensing or output wire also links the coil, to sense a change in the direction of magnetization in the coil.

Each core can store, one at a time, two mutually exclusive bits of information, namely, whether the core is magnetized in one direction, in which case the stored bit of information is arbitrarily designated as "0", or whether the core is magnetized in the other direction, in which case the stored bit of information is arbitrarily designated as "1". Assuming two input wires, these two bits of information can be read out of the core, as follows. Assume the core is in the "0" state of magnetization, and a current pulse (having a duration of perhaps less than a thousandth of a second) with a magnitude sufficient to cause an applied field of $\frac{1}{2}H_{max}$ is passed through each wire, the total applied field will be $H_{max}$, and the magnetization of the core will proceed from 0 through an arbitrary point B on a hysteresis loop to 1. Because the core changes its direction of magnetization, a large current pulse (caused by a flux change) is generated in the output wire, indicating that the previous state of the wire was "0". If an $H_{max}$ field is applied to the core when its state of magnetization is at point 1 on the hysteresis loop, the magnetization of the core will proceed from point 1 to the arbitrary point B and back to 1, and only a small current pulse (caused by a flux change) will be generated in the output wire, indicating that the previous state of the core was "1".

Generally an elongated hysteresis loop with a pronounced rectangular shape and substantially vertical sides (a "square" loop) is desirable for computer cores, for reasons which include the following: (a) in many applications it is important that the magnetization of the core cannot be reversed by an applied field of one-half the magnitude required to reverse the magnetization and saturate the core, i.e., a field of $\frac{1}{2}H_{max}$ or $-\frac{1}{2}H_{max}$ will not switch the core; (b) the remanence should be large, to achieve the greatest differentiation between the output current changes caused by flux changes of, respectively; (c) a low coercivity is required for many cores so that they can be switched, with a switching time constant of a few microsecond-oersteds or less, with smaller current pulses, with a resulting energy input saving.

In addition, a low initial permeability, for example below 50, and a high permeability at remanence and a high maximum permeability are desirable. With a high remanence and low coercivity, the desired high permeability at remanence, approaching maximum permeability, will exist.

Crystallite size of ferrimagnetic materials prepared by prior art methods other than the method of U.S. Pat. No. 3,425,666 is generally greater than single-domain size; accordingly, prior art switching devices utilizing such materials are limited to switching involving domain wall motion as well as domain rotation. The combination of these two mechanisms decreases the speed and broadens the time for the total device to switch.

A limited range of ferrimagnetic compositions may be prepared by prior art methods other than those of U.S. Pat. No. 3,424,666, since cation migration to the proper anion sites during preparation must be over many atomic distances and, therefore, extremes in temperature are necessary to effect such migration. Chemical valence changes resulting from these high temperatures prevent formation of many important ferrite materials.

PROBLEM PECULIAR TO MIXED ALKALI METAL SUBSTITUTION FERRITES

It has been found that when alkali metal substitution ferrites (as opposed to ferrites not containing alkali metal) are prepared by the method set out in U.S. Pat. No. 3,425,666, a portion of the alkali metal, for example, lithium, tends to migrate out of the bulk ferrite during drying by heating thereof. Although it is not essential, it is preferred that when ferrites are made by the process of U.S. Pat. No. 3,425,666 the gel material be first mildy heated to dry said gel and remove the majority of the solvent therefrom. Typical temperatures for this mild heating are in the range from about 70° C. to about 150° C. Even when this preferred method is not used, the gel during the process of being heated to a temperature of preferably above about 600° C. passes through a series of intermediate temperatures and while it is passing through this series of intermediate temperatures the majority of the solvent is removed therefrom.

As was stated above, it has been found that during the low temperature drying, or if low temperature drying is not used during the time the gel is being heated to preferably a temperature of above about 600° C. and while the majority of this solvent is being removed from said gel, at least a portion of the alkali metal tends to migrate to the external surface of the ferrite. This is undesirable since the amount of alkali metal, for example lithium, left in the ferrite is uncertain. Further, the alkali metal may not be distributed uniformly throughout the ferrite leading to less desirable magnetic properties. Still further, the lithium or other alkali metal which is on the surface of the particle made when the sample is heated preferably to a temperature of above about 600° C. may lead to undesirable physical properties in the resulting ferrite, for example, the ferrite may be overly hygroscopic and thus tend to agglomerate.

Accordingly, it is an object of the present invention to provide a process for manufacturing mixed alkali metal substitution ferrites wherein migration of the alkali metal to the surface of the ferrite does not occur.

It is a further object of the invention to provide mixed alkali metal substitution ferrites having a known concentration of lithium substantially uniformly distributed therethrough.

The present invention accomplishes these objects and other objects which will be apparent to one skilled in the art from the description hereinbefore and hereinafter.

THE PRESENT INVENTION

The present invention is a process for manufacturing materials, a mass of finely divided particles of which an applied magnetic field can induce to change from a non-magnetized condition in a sense of exhibiting no net external field, to a magnetized condition in a sense of exhibiting an external field. The process comprises reacting starting materials comprising a salt of an alkali metal, e.g. lithium, sodium, or potassium, a salt of a first metal in a divalent state, a salt of iron in the trivalent state, and an epoxy compound in the presence of solvent selected from the group consisting of lower alkanols and water to obtain a mixture ccomprising a metal hydroxide gel containing solvent and halohydrin (e.g., chlorhydrin), drying the gel to remove the majority of the solvent and halohydrin therefrom without significantly altering the distribution of an alkali metal, e.g. lithium, sodium or potassium therein and heating the thus dried mixture which is homogeneous in alkali metal distribution to produce the desired material. The process of the present invention is substantially an improvement over the process of U.S. Pat. No. 3,425,666 insofar as making the ferrimagnetic material of the present invention, i.e., mixed alkali metal substitution ferrites, is concerned. The heart of the present invention resides in the fact that migration of alkali metal to the surface of ferrimagnetic material during the "Microgel" process described in said U.S. Pat. No. 3,425,666 is prevented by the process of the present invention.

The Microgel process, which may be used to prepare the materials used in forming the products of the present invention, comprises converting a salt of an alkali metal, lithium, sodium, or potassium, a salt of a first metal, generally in the divalent state, and a salt of a second metal in the trivalent state, at least one of said metals preferably being iron, to a mixture of the corresponding hydroxides in the presence of an epoxy compound and a source of hydroxyl groups, for example water, said salts comprising halogens having atomic numbers greater than 9, and heating said mixture for a sufficient time to produce a ferrimagnetic material.

The epoxy compound may be any epoxy compound that will react at a reasonable rate with the anion of the metal salt, preferably a lower alkylene oxide or an epichlorohydrin. Said lower alkylene oxide may be, for example, ethylene oxide, propylene oxide or butylene oxide. The preferred lower alkylene oxide, because of its physical properties including liquid range and solubility, is propylene oxide.

The metal salt preferably is a metal halide comprising a halogen having an atomic number greater than 9, i.e., a metal chloride, iodide or bromide. The chlorides and iodides are especially preferred. Salts other than halides, for example nitrates, having anions that will combine with the epoxy compound, may be used but at least one of the salts should be a halide.

Desirably a solvent, such as a lower alcohol, should be present.

The following is an example of the reaction that takes place in the Microgel process when an alkali metal substitution ferrite is produced:

$$MnCl_2 + Fe^{+3}Cl_3 + LiCl + CH_3OH + H_2O +$$
$$CH_2OCHCH_3 \rightarrow Li_{0.5}Mn_{0.75}Fe_2(OH)_8 + A$$

where $Li_{0.5}Mn_{0.75}Fe_2(OH)_8$ is a sol that has the desired homogeneous atomic structure, i.e., it contains a uniform dispersion of each of the various ions, and where A includes all of the remaining reaction products. The $Li_{0.5}Mn_{0.75}Fe_2(OH)$ sol will slowly form into a gel if permitted to do so, and this is a preferred method of practicing the invention. The remaining reaction products, A, mainly comprise chlorohydrins such as propylene chlorohydrin, and readily vaporize to leave the desired gel in an adequately pure state.

In the above exemplary reaction, assuming that water is the source of the hydroxyl groups, a hydrogen atom from the water molecule attaches to the oxygen atom of the epoxy compound, leaving one of the epoxy compound carbon atoms with an unsatisfied bond. A halogen atom from one of the metal halides attaches to this bond, leaving the metal with an unsatisfied bond. The latter bond is satisfied with the hydroxyl group remaining from the water molecule.

Because it is important to have a homogeneous solution of all of the necessary components of the final product, it is very desirable to have a solvent present that: (a) will keep the metal salts in solution; (b) will keep the epoxy compound in solution; and (c) will not irreversibly react with the precursors of the final product, or with the final product itself, to incorporate undesired constituents into the final product. Such a solvent should be one that is more polar than the epoxy compound, for example an organic solvent such as a lower alcohol or water. If a sufficient amount of water is present, it will act as the necessary solvent in addition to supplying the hydroxyl groups for the desired product. If only water is relied upon as the solvent, it will be very desirable to use ethylene oxide as the epoxy compound rather than a higher alkylene oxide such as propylene oxide, because the solubility of ethylene oxide is higher in water than is the solubility of a higher alkylene oxide, and the higher solubility increases the probability that the desired epoxy compound concentration in the starting solution can be obtained. However, the presence of an organic solvent in addition to the presence of water is most preferred. Such a solvent may be any organic solvent meeting the aforesaid criteria, for example a lower alkanol, for example methanol, ethanol or propanol, or dimethyl formamide. Methanol is most preferred because it is very polar, as is water.

The metal halides used may be halides of any metals that are desired in the final ferrimagnetic product, so long as a halide of at least one metal, generally in the divalent state, is present, and a halide of at least one other metal, in the trivalent state, is present. For example, halides of $Li^+$, $Na^+$, $K^+$, $Fe^{+2}$, $Co^{+2}$, $Mg^{+2}$, $Ni^{+2}$, $Mn^{+2}$, $Cu^{+2}$, $Ba^{+2}$, $Fe^{+3}$, $Al^{+3}$, $Cr^{+3}$, $Ti^{+3}$, $Ga^{+3}$, $In^{+3}$, $Gd^{+3}$, $Sc^{+3}$, and $Y^{+3}$ may be used. The preferred halides of the metal in the divalent state are the manganese halides and magnesium halides. Preferably a halide of iron will be present, more preferably $Fe^{+3}Cl_3$. The proportions of all of the starting materials can be varied over relatively wide ranges, so long as a homogeneous solution can be obtained. From the present disclosure, including the examples, those skilled in the art will have an adequate guide as to the proportions of ingredients and specific preparation methods that will result in a high degree of homogeneity of the starting mixtures and final ferrimagnetic products. Generally, the constituents of the final ferrimagnetic product may be present in approximately stoichiometric proportions in the starting materials; however, it may be desired to have present an excess of divalent or trivalent iron, particularly when it is desired that the final product have especially high coercivity.

The amounts of each of the starting halides may be varied by substituting for it a halide of a different metal having the same valence, to give various weight percentages of each metal cation in the final ferrimagnetic product.

In the preferred manner of practicing the Microgel process for preparing the materials used in the products of the present invention, the sol precursor of the final ferrimagnetic material will form into a gel filling substantially the entire volume of the solution from which it is formed in a period of a few seconds to a few hours, depending upon the concentration of the various components and the temperature. The resulting gel, after drying to drive off vaporizable materials not forming a part of the gel, is nonferrimagnetic, but becomes ferrimagnetic after a subsequent heating step.

As has been stated above, the mixed alkali metal substitution ferrites of the present invention contain an alkali metal, e.g., lithium, sodium, or potassium, most preferably lithium. When lithium is present in said ferrites, a substantially squared hysteresis loop results in the resulting ferrites and squared hysteresis loop being especially useful in toroids made using the ferrite material. In order to prevent, or at least minimize, migration of the alkali metal to the surface of the ferrite during the subsequent heating of the ferrite material, it is necessary to dry the gel mixture by a method whereby the distribution of lithium, sodium or potassium is not significantly altered. This drying method may constitute, for example, freeze drying or spray drying of the gel. Most preferably, the gel is freeze dried. When the gel is freeze dried, it has been found that the alkali metal, e.g. lithium, does not migrate to the surface of the ferrimagnetic material formed to any significant extent and the distribution of the alkali metal, e.g. lithium, in the resulting final ferrimagnetic material is not significantly altered. When, for example, the preferred solvent of methanol is used, the freeze drying is generally carried out at a temperature of below about $-100°$ C. The resulting dried material is in the form of porous particles, said porous particles generally having sizes in the range from about 20 microns to about 250 microns and preferably from about 50 microns to about 100 microns. The porous particles comprise a precursor from which ferrimagnetic material can be formed as described below.

To convert the non-ferrimagnetic precursor to a ferrimagnetic material, it is heated to a temperature above 600° C., preferably above 800° C., more preferably between 1100° C. and 1600° C., to cause the metal cations to migrate between the oxygen anions to the proper sites, e.g., the tetrahedral or octahedral sites of a spinel oxygen structure, as previously discussed. The heating time may be varied from two or three minutes to many hours. However, the higher the temperature the less time will be required for complete cation migration, and after migration is complete continued heating is generally of little use. At 1300° C., a heating time of 3 to 5 hours is desirable. Heating may be terminated prior to complete cation migration, and therefore magnetic properties, particularly coercive force, may be varied by varying the duration of heating.

Preferably the non-ferrimagnetic sol or gel after the drying to remove alcohol without significantly altering the distribution of alkali metal, e.g., lithium, sodium, or potassium therein and before heating to above 600° C. is preheated at a temperature within the range from about 100° C. to about 500° C. for a time from about 2 hours to about 24 hours.

The resulting ferrimagnetic material is microporous in that it contains myriads of micropores, i.e., pores below 0.1 micron (1000 Angstroms) in diameter, as well as larger pores. Although the larger pores are present, they have a much lower surface area per volume of pore, and so contribute little to the surface area of the material, compared with the contribution to surface area made by the micropores. This extremely high surface area, microporous material accordingly is much more frangible than corresponding prior art materials; because the micropores constitute natural fracture lines, the material can be physically broken down into single-domain particles much more readily than can corresponding prior art materials, which often must be ball milled for days before the particle diameters approach a micron or less.

Not only can the particles readily be broken down in size, but it is not necessary to break them down in size as far as in the case with prior art particles in order to obtain particles having single-domain magnetic behavior. This is because as a particle is broken down in size it is still microporous, and the micropores impede domain wall movement; accordingly, when the particles of the present invention are reduced to a certain size they will behave magnetically as single-domain particles, even though more than one domain is present. Further, particle grinding of a batch of ferrimagnetic powder prepared according to the method described herein will result in a smaller ratio of superparamagnetic particles that retain no magnetization after removal of an applied field to particles that behave as single-domain particles than will particle grinding of prior art ferrimagnetic powders. I.e., in both prior art methods and the method described herein, milling results in the production of superparamagnetic particles, larger single-domain particles that are not paramagnetic, and multi-domain particles. Because some of the latter behave as single-domain particles in the present method, the total amount of particles that behave as single-domain particles that are produced for a given production of superparamagnetic particles is larger in the method described herein than in prior art processes. For most applications it is desirable to break down the particles of a mass of ferrimagnetic material prepared according to the method described herein to an average particle size below about one micron.

The non-ferrimagnetic porous particles obtained by drying the gel without significantly altering the distribution of alkali metal therein are preferably formulated into toroidal shapes. This may be done by any of the known prior art methods, including pressing and pelleting and the like. Preferably, the porous particles, which if desired may be ground (such as by a fluid energy mill) are formulated into toroidal shapes by dispersing said particles in a polymerizable liquid or partially polymerized fluid elastomer matrix, then polymerizing said liquid or partially polymerized fluid elastomer matrix in the form of a flat sheet or tape, said flat sheet or tape after said polymerizing having said particles substantially uniformly dispersed therethroughout and then stamping out toroidal shapes from said polymer sheet or tape. During subsequent heating of the sheet or tape containing the ferrimagnetic precursor at higher temperatures, the polymer material is vaporized and/or burnt out and thereby removed from the ferrimagnetic material.

Preferably, after the preheating step described above or alternatively in a single heating step, the ferrimagnetic precursor that was dispersed throughout the polymer is heated to a temperature above 660° C., more preferably between 1100° C. and 1600° C. to convert it into a ferrimagnetic material as previously set out, The ferrimagnetic materials prepared by the method described herein can easily be comminuted and fabricated into shapes. The comminuted material can be pressed into shapes having dimensions close to the final desired dimensions. Accordingly, little finish grinding of the fired shapes is necessary.

EXAMPLES

In the following examples, the Microgel process was used to prepare mixed alkali metal substitution ferrites both by the prior art process of U.S Pat. No. 3,425,666 and by the method of the present invention.

EXAMPLE 1

A solution of the following composition was prepared:

| | |
|---|---|
| LiCl | 105 grams |
| $MnCl_2 \cdot 4H_2O$ | 296 grams |
| $FeCl_3 \cdot 6H_2O$ | 595 grams |
| $CH_3OH$ | 2500 cc |

The solution was cooled to 5° C., 590 cc of propylene oxide was added, the temperature rose and was returned to 5° C., The resulting material set up into a gel in about 5 minutes. The additional 500 cc of methanol was added to loosen the gel so it would flow and then 260 cc of propylene oxide was added to give a ratio of 1.4 to 1 propylene oxide to chloride. The gel was dried at 72° C for about 18 hours.

The resulting powder had a white fuzzy appearing substance on the top thereof.

This example demonstrates the problem of alkali metal, specifically lithium, separation which exists when preparing a mixed alkali metal substitution ferrite material.

EXAMPLE 2

A solution of the following composition was prepared: ,02/0190

| | |
|---|---|
| LiCl | 105 grams |
| $MnCl_2 \cdot 4H_2O$ | 296 grams |
| $FeCl_3 \cdot 6H_2O$ | 595 grams |
| $CH_3OH$ | 2500 cc |

The solution was cooled to 5° C., 850 cc of propylene oxide was added, the temperature rose and was returned to 5° C. The resulting material set up into a gel in 10 minutes.

The gel was heated to distill off the methanol and isopropyl alcohol was added to replace the methanol concurrently with the methanol removal.

The resulting isopropanol-containing gel was dried in air in an oven at 210° F. over a weekend and then was further dried for 2 days in a vacuum oven at 210° F.

A fuzzy appearing material, clearly differnt than the bulk powder thus formed, was observed on the top of the powder. A sample of the crust including the fuzzy material and a sample of the bottom was taken. Both samples were anaylzed by emission spectroscopy for lithium content with the following results:

| Portion Tested | Lithium, Wt. % |
|---|---|
| Crust | 6.1 |
| Bottom | 4.4 |

This example demonstrates that the problem of lithium migration exists even when a solvent such as isopropyl alcohol, in which lithium chloride is less soluble than it is in methanol, is used.

EXAMPLE 3

A solution of the following composition was prepared: ,03/0190

| LiCl | 105 grams |
|---|---|
| $MnCl_2 \cdot 4H_2O$ | 296 grams |
| $FeCl_3 \cdot 6H_2O$ | 595 grams |
| $CH_3OH$ | 2500 cc |

The solution was cooled to 5° C., 850 cc of propylene oxide was added, the temperature rose and was returned to 5° C. The resulting material set up into a gel in 5 minutes. The gel was allowed to stand for 3 days at room temperature.

The methanol was then distilled off while a 25 volume percent solution of propylene oxide in isopropanol was added to the gel. The resulting isopropanol-containing gel was dried in an open oven for 5 days at a temperature of about 70° C. The material after the drying at 70° C. exhibited a fuzzy material clearly different from the bulk powder on the top. The fuzz, the crust (top 10 percent) and the bottom (lower 10 percent) were each sampled and the samples were analyzed for lithium content. The results of the analysis by emission spectroscopy were as follows:

| Portion Tested | Lithium, Wt. % |
|---|---|
| Fuzz | 8.8 |
| Crust | 2.9 |
| Bottom | 2.2 |

Samples of the material dried at 70° C., when heated in air at much higher temperatures, for example at about 535° C., about 760° C., and about 815° C. gained considerable weight, evidently due to adsorption of or reaction with water.

This example further illustrates the problem of lithium migration.

EXAMPLE 4

A solution of the following composition was prepared:

| 10.5 g. | LiCl |
|---|---|
| 29.6 g. | $MnCl_2 \cdot 4H_2O$ |
| 59.5 g. | $FeCl_3 \cdot 6H_2O$ |
| 250 cc. | $CH_3OH$ |

The solution was cooled to 5° C., 85cc of propylene oxide was added and the temperature rose and was returned to 5° C. Water, 3cc, was added to the solution, after which the resulting material set up into a gel in 10 minutes.

The gel was formed in a flask adapted for connection to a vacuum apparatus. The flask was attached to a vacuum apparatus and a liquid nitrogen-containing dewar was placed around the flask thus assuring that the temperature of the flask remained at about −196° C. The flask was then evacuated and the gel was freeze dried for about 4 hours until substantially all of the methanol and non-chemically bonded water had been removed therefrom.

The crust top (top 10 percent) layer of the resulting freeze dried powder and the bottom (lower 10 percent) layer of the freeze dried product were each sampled. The crust and bottom samples were analyzed for lithium content with the following results:

| Portion Tested | Lithium, Wt. % |
|---|---|
| Crust | 4.2 |
| Bottom | 4.5 |

The analysis was performed by emission spectroscopy.

This example illustrates that significant alkali metal, e.g., lithium migration, does not occur when an alkali metal substitution ferrite is freeze dried, i.e., dried by the method of the present invention.

EXAMPLE 5

This example illustrates that the problem of metal migration does not occur with ferrites of the type described in U.S. Pat. No. 3,425,666, which do not contain alkali metals.

A solution of the following composition was prepared:

| $YCl_3$, g. | 245.9 |
|---|---|
| $FeCl_3$, g. | 219.2 |
| $FeCl_2$, g. | 107.2 |
| $CH_3OH$, cc. | 1480 |
| $H_2O$, cc. | 400 |

The solution was cooled to 0° C. and 178 cc. propylene oxide were added. The resulting material set up to a gel in 15 minutes.

The gel was dried in a drying oven at 300° F. The resulting dried product was then treated in three steps:

a. heating at 800° C. in an air atmosphere for 4 hours to convert the dried gel to a form which could be readily powdered; in this step the hydroxides were converted to mixed oxides and the material was ground to a powder; although this step was not necessary, it facilitated the production of a denser powder so that more material could be treated in a particular furnace in the subsequent heating step;

b. powdering of the resulting material in a conventional manner;

c. firing at 1300° C. for 4 hours in order to convert the powder to a ferrimagnetic material.

The resulting yttrium iron garnet structure had a small (less than 1 micron) crystallite structure. The crystallites were quite uniform in size. The product was uniform in composition with no migration of metal ions to the external surface.

This example illustrates that conventional drying techniques are satisfactory for ferrites that do not contain alkali metal.

EXAMPLE 6

A solution of substantially the composition of the solution of Example 1 is prepared.

The solution thus prepared is gelled by addition of propylene oxide and cooling. The resulting material is then spray dried. Migration of lithium to the crust layer is reduced over that observed for the sample of Example 1.

Although the invention has been described in connection with specific embodiments thereof, it will be understood that it is capable of further modification, and this application is intended to cover any variations, uses, or adaptations of the invention following, in general, the principle of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows.

1. A process for manufacturing a material, a mass of finely divided particles of which an applied magnetic field can induce to change from a non-magnetized condition, in a sense of exhibiting no net external field, to a magnetized condition, in a sense of exhibiting an external field, which comprises:
   a. reacting starting materials comprising a salt of an alkali metal, a salt of a metal in a divalent state, a salt of iron in a trivalent state, at least one of said salts being a halide, and an epoxy compound, in the presence of a solvent selected from the group consisting of lower alkanols and water, to obtain a mixture comprising a metal hydroxide-containing and solvent-containing gel;
   b. freeze drying said gel to remove the majority of the solvent therefrom without significantly altering the distribution of alkali metal therein, to obtain porous particles; and
   c. heating the porous particles to a temperature above 600° C. to produce the desired material.

2. A process as in claim 1, including, as added steps after said freeze drying and before said heating:
   preheating the freeze-dried mixture at a temperature within the range from about 100° to about 500° C. for a time from about 2 hours to about 24 hours.

3. A process as in claim 2, wherein said porous particles are of a size within the range from about 20 microns to about 250 microns.

4. A process as in claim 1, including, as an added step before said heating:
   formulating said porous particles into toroidal shapes.

5. A process as in claim 4, wherein said formulating comprises:
   dispersing said porous particles in a polymerizable liquid;
   polymerizing said liquid in the form of a flat polymer sheet, said flat polymer sheet after said polymerizing having said porous particles dispersed therethroughout; and then
   stamping out shapes from said polymer sheet.

6. A process as in claim 1, wherein said salt of an alkali metal is a salt of lithium, said epoxy compound comprises propylene oxide and said solvent comprises methanol and water.

7. A process as in claim 1, wherein said metal in the divalent state is selected from the group consisting of manganese and magnesium.

* * * * *